US012255482B2

(12) United States Patent
Han et al.

(10) Patent No.: US 12,255,482 B2
(45) Date of Patent: Mar. 18, 2025

(54) PLUG-IN TYPE ENERGY STORAGE SYSTEM

(71) Applicant: SK On Co., Ltd., Seoul (KR)

(72) Inventors: Dong Hwa Han, Daejeon (KR); Yong Uk Kim, Daejeon (KR)

(73) Assignee: SK ON CO., LTD., Seoul (KR)

( * ) Notice: Subject to any disclaimer, the term of this patent is extended or adjusted under 35 U.S.C. 154(b) by 663 days.

(21) Appl. No.: 17/560,768

(22) Filed: Dec. 23, 2021

(65) Prior Publication Data

US 2022/0216716 A1 Jul. 7, 2022

(30) Foreign Application Priority Data

Jan. 5, 2021 (KR) ........................ 10-2021-0000936

(51) Int. Cl.
*H02J 7/00* (2006.01)
*H01M 10/42* (2006.01)
(Continued)

(52) U.S. Cl.
CPC ....... *H02J 7/00712* (2020.01); *H01M 10/425* (2013.01); *H01M 10/46* (2013.01); *H01M 50/204* (2021.01); *H01M 50/251* (2021.01); *H02J 7/00036* (2020.01); *H02J 7/0013* (2013.01); *H02J 7/0029* (2013.01);
(Continued)

(58) Field of Classification Search
CPC ............. H02J 7/00036; H02J 7/00048; H01M 50/204; H01M 50/251
See application file for complete search history.

(56) References Cited

U.S. PATENT DOCUMENTS

| 2007/0188130 A1 | 8/2007 | Scheucher et al. |
| 2015/0022001 A1 | 1/2015 | Goei et al. |

(Continued)

FOREIGN PATENT DOCUMENTS

| KR | 20130124881 A | 11/2013 |
| KR | 20160057905 A | 5/2016 |

(Continued)

OTHER PUBLICATIONS

EP21212302.0 Extended European Search Report dated Jun. 2, 2022, 11 pgs.

*Primary Examiner* — Robert Grant
(74) *Attorney, Agent, or Firm* — IP & T GROUP LLP

(57) ABSTRACT

A plug-in type energy storage system is proposed. The system includes: a plurality of battery racks configured to store power; and a panel configured to control charging or discharging of the plurality of battery racks, where each battery rack includes: a plurality of battery modules configured to store the power; a control module connected to each battery module and the panel to control the charging or discharging of each battery module according to a control signal received from the panel; a conversion module connected to the control module to convert waveforms of the power into direct current or alternating current according to a control signal received from the control module; and a casing configured to accommodate each battery module, the conversion module, and the control module. In addition, the plurality of battery modules and the battery power management unit integrally constitute each battery rack.

10 Claims, 5 Drawing Sheets

(51) Int. Cl.
*H01M 10/46* (2006.01)
*H01M 50/204* (2021.01)
*H01M 50/251* (2021.01)
*H02J 7/02* (2016.01)

(52) U.S. Cl.
CPC .............. *H02J 7/0048* (2020.01); *H02J 7/02* (2013.01); *H01M 2010/4271* (2013.01); *H01M 2220/10* (2013.01); *H02J 2207/20* (2020.01)

(56) References Cited

U.S. PATENT DOCUMENTS

2015/0022140 A1* 1/2015 Heishi ................... H02J 7/0045
320/108
2017/0106764 A1 4/2017 Beaston et al.

FOREIGN PATENT DOCUMENTS

| KR | 101634012 B1 | 6/2016 |
| KR | 101726922 B1 | 4/2017 |
| KR | 101761031 B1 | 7/2017 |
| KR | 101761034 B1 | 7/2017 |
| KR | 101761035 B1 | 7/2017 |
| KR | 20170078395 A | 7/2017 |
| KR | 20170079811 A | 7/2017 |
| KR | 20170080917 A | 7/2017 |
| WO | 2019236883 A1 | 12/2019 |

* cited by examiner

PLUG-IN TYPE ENERGY STORAGE SYSTEM

CROSS REFERENCE TO RELATED APPLICATION

The present application claims priority to Korean Patent Application No. 10-2021-0000936, filed Jan. 5, 2021, the entire contents of which is incorporated herein for all purposes by this reference.

BACKGROUND OF THE INVENTION

Field of the Invention

The present disclosure relates to a plug-in type energy storage system.

Description of the Related Art

A power network that supplies electricity produced by power plants does not perform a function of storing electric power. Recently, as the amount of generation of renewable energy increases, the development of an energy storage system configured to store the electricity is required. The energy storage system may store electrical energy produced from renewable energy sources and provide the electrical energy to the power network when needed. The energy storage system may operate in a method of charging and discharging the electricity to and from batteries. Each battery composed of rechargeable secondary cells deteriorates while repeatedly charging and discharging, so performance thereof deteriorates, and a power converter for controlling the power of each battery is also exposed to failure due to the charging and discharging. Therefore, it is necessary to exchange the batteries and the power converter that are included in the energy storage system.

DOCUMENTS OF RELATED ART (Patent Document 1) KR 10-1634012 B1

SUMMARY OF THE INVENTION

An objective according to an exemplary embodiment of the present disclosure is to provide a plug-in type energy storage system that includes a plurality of battery racks and is provided with a battery power control unit for each battery rack so that each of the battery racks may be charged or discharged independently.

In addition, another objective according to the exemplary embodiment of the present disclosure is to provide a plug-in type energy storage system in which a plurality of battery modules constituting each battery rack and a battery power control unit for controlling each battery module are integrally formed to allow the same to be easily exchanged in a plug-in method.

A plug-in type energy storage system according to the exemplary embodiment of the present disclosure includes: one or a plurality of battery racks configured to store power; and a panel configured to control charging or discharging of each battery rack, wherein each battery rack may include: one or a plurality of battery modules configured to store the power; a control module connected to each battery module and the panel to control the charging or discharging of each battery module according to a control signal received from the panel; and a conversion module connected to the control module to convert waveforms of the power into direct current or alternating current according to a control signal received from the control module.

In addition, the plug-in type energy storage system according to the exemplary embodiment of the present disclosure may further include a casing configured to accommodate each battery module, the conversion module, and the control module.

In addition, in the battery racks, each battery module, the conversion module, and the control module may be accommodated in the casing to become one package, thereby allowing module exchange in units of battery racks.

In addition, the control module may include one or more of the following: an AC connector configured to transmit and receive the power to and from the panel; a DC connector configured to transmit and receive the power to and from each battery module; a communication connector configured to transmit and receive data to and from the panel or each battery module; an AC protection part connected to the conversion module and the AC connector to prevent propagation of an accident; a DC protection part connected to the conversion module and each battery module to prevent the propagation of the accident; and a rack control unit connected to the communication connector to collect a state of each battery module and control the conversion module on the basis of the control signal received from the panel.

In addition, the conversion module may include one or more of the following: a low-pass filter connected to the AC protection part to remove harmonics of AC power; a DC link capacitor connected to the DC protection part to equalize a voltage of DC power; and a power converter connected to the low-pass filter and the DC link capacitor, and configured to change the waveforms of the power into the alternating current or the direct current according to a control signal received from the rack control unit.

In addition, the rack control unit may include: a battery management system configured to monitor the state of each battery module and control the charging or discharging; and a power controller configured to control the power converter as the battery management system controls the charging or discharging.

In addition, the plurality of battery modules may be arranged to be spaced apart from each other in a vertical direction or a left and right direction inside the casing, the control module and the conversion module may be arranged to be spaced apart from each other in the vertical direction or the left and right direction of each battery module inside the casing, and the casing may discharge air introduced from a gap spaced apart between each battery module, the control module, and the conversion module to outside of the casing, and further include a fan formed on one side of the casing.

In addition, the control module may have one surface thereof on which the AC connector, the DC connector, and the communication connector are arranged, and each battery module may have one surface thereof to which the DC connector of the control module or the DC line connected to other battery modules are connected.

In addition, the control module and the conversion module each may have air holes formed therein so that the air introduced from a front surface of the control module passes through the control module and the conversion module, thereby being discharged to an upper surface of the conversion module, and each air hole formed on the upper surface of the conversion module may be formed at a position corresponding to the fan of the casing.

In addition, the panel may include: an energy management system configured to generate a control signal for controlling the charging or discharging of the plurality of battery racks and provide the control signal to each of the plurality of battery racks; and an AC bus connected to the plurality of battery racks to share the power of the plurality of battery racks.

In addition, in the plurality of battery racks, at least one battery rack may include battery cells of a type different from that of another battery rack, or at least one battery rack comprises reusable battery cells, and according to the type or a charge state of each of the plurality of battery racks, the energy storage system may be configured to simultaneously control at least one battery rack to be charged and at least another battery rack to be discharged, or control an amount of power to be charged to or discharged from the at least one battery rack and the at least another battery rack to be different from each other.

In addition, when any one of the plurality of battery racks is exchanged or a new battery rack is additionally connected, the energy management system may receive information about a state of each battery rack from the rack control unit and automatically perform control according to a type or a charge state of each battery cell of each battery rack.

In addition, in order to exchange each battery module, the control module, or the conversion module, the casing may be configured such that each battery module, the control module, or the conversion module are attachable and detachable, respectively.

In addition, the plurality of battery racks may be connected to the panel by a predetermined number to form one cluster, and the energy storage system may be controlled in units of cluster.

The features and advantages of the present disclosure will become more apparent from the following detailed description taken in conjunction with the accompanying drawings.

Prior to this, the terms or words used in the present specification and claims should not be construed as conventional and dictionary meanings, but it should be interpreted as meaning and concept consistent with the technical spirit of the present disclosure on the basis of the principle that the inventor can adequately define the concept of each term to best describe his or her invention.

According to the exemplary embodiment of the present disclosure, the plurality of battery modules and the battery power management unit integrally constitute each battery rack, so when exchanging batteries, the batteries may be integrally exchanged in units of battery racks.

In addition, according to the exemplary embodiment of the present disclosure, since the battery power control unit is provided for each of the plurality of battery racks to perform charging or discharging in units of battery racks, the battery racks constituting one energy storage system may be composed of heterogeneous batteries or reusable batteries.

DETAILED DESCRIPTION OF THE INVENTION

Figure 1:
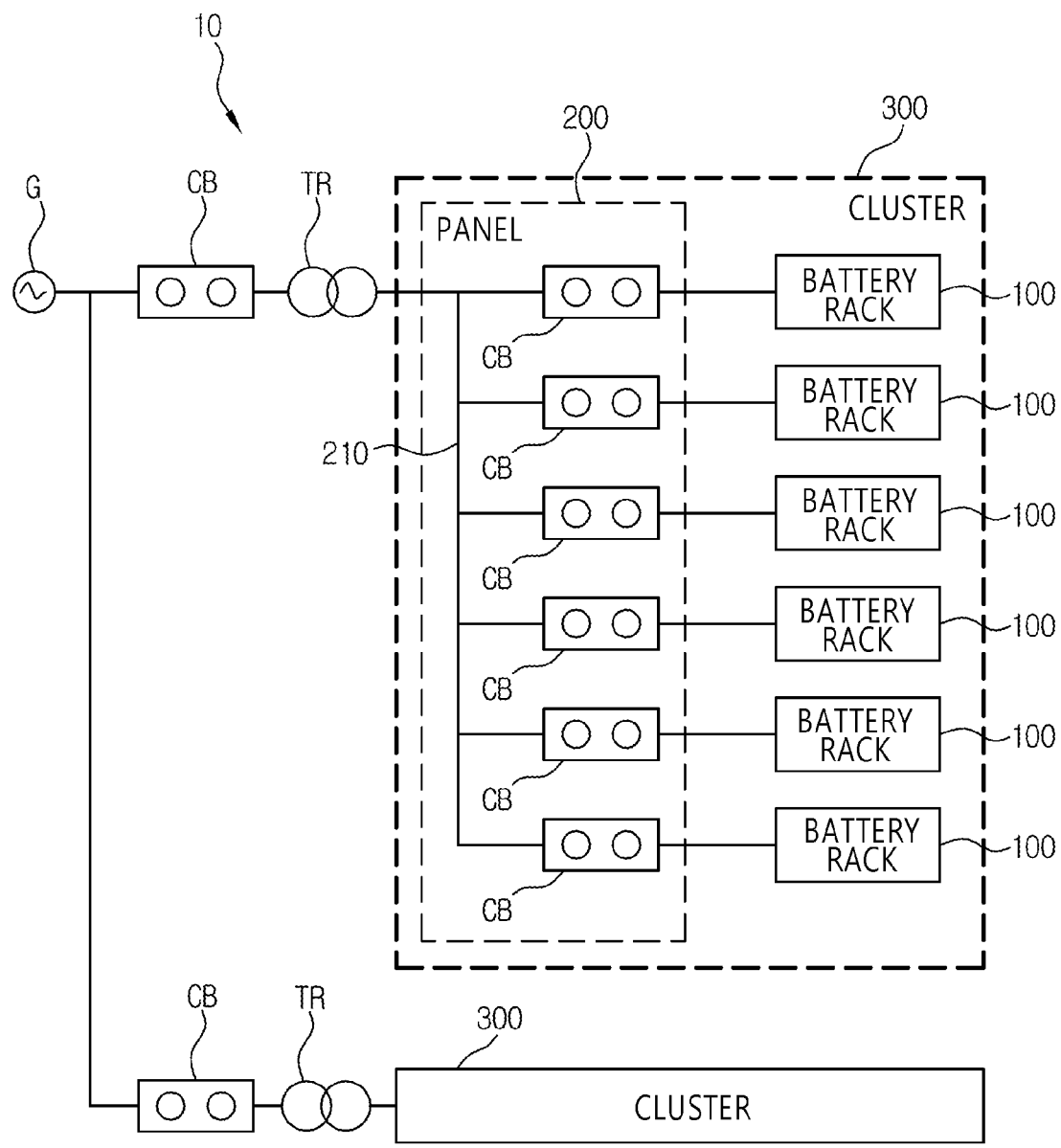
FIG. 1 is a view illustrating a plug-in type energy storage system according to an exemplary embodiment of the present disclosure.

Objectives, advantages, and features of exemplary embodiments of the present disclosure will become more apparent from the following description of the exemplary embodiments taken in conjunction with the accompanying drawings. In adding reference numerals to the components of each drawing, it should be noted that the same reference numerals are used to refer to the same components as much as possible even if displayed on different drawings. In addition, terms such as "one surface", "the other surface", "first", "second", etc. are used to distinguish one component from another component, and the components are not limited by the terms. In addition, it should be understood that even when a component is expressed in a singular number, a plurality of corresponding components may exist. Hereinafter, in describing the exemplary embodiments of the present disclosure, detailed descriptions of related known technologies that may unnecessarily obscure the gist of the exemplary embodiments of the present disclosure will be omitted.

Hereinafter, an exemplary embodiment of the present disclosure will be described in detail with reference to the accompanying drawings.

Figure 2:
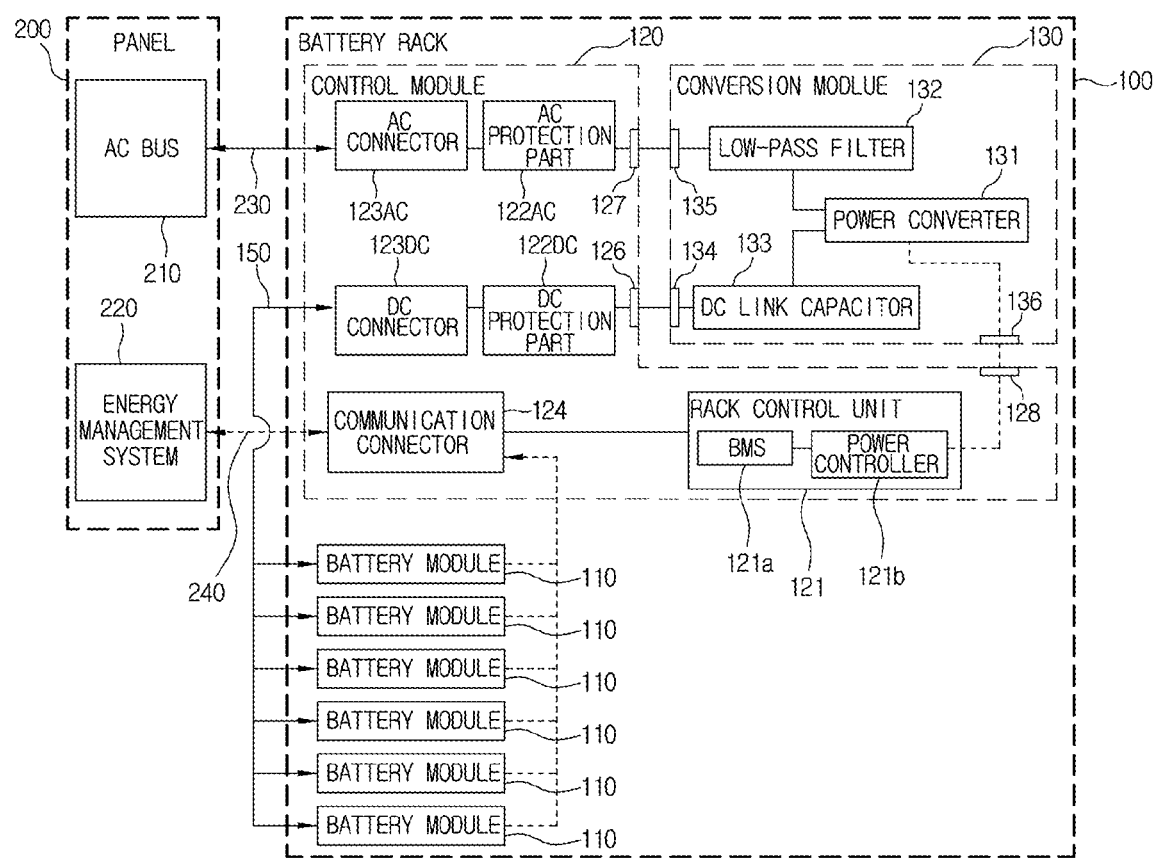
FIG. 2 is a view illustrating a battery rack and a panel of the plug-in type energy storage system according to the exemplary embodiment of the present disclosure.

FIG. 1 is a view illustrating a plug-in type energy storage system 10 according to the exemplary embodiment of the present disclosure. FIG. 2 is a view illustrating a battery rack 100 and a panel 200 of the plug-in type energy storage system 10 according to the exemplary embodiment of the present disclosure. In the present specification, the "plug-in type energy storage system 10" may be briefly described as a "plug-in ESS 10".

As shown in FIGS. 1 and 2, the plug-in type energy storage system 10 according to the exemplary embodiment of the present disclosure may include: one or a plurality of battery racks 100 configured to store electric power; and the panel 200 configured to control charging or discharging of each battery rack 100. In addition, each battery rack 100 may include: one or a plurality of battery modules 110 configured to store electric power; a control module 120 connected to each battery module 110 and the panel 200 to control charging or discharging of each battery module 110 according to a control signal received from the panel 200; and a conversion module 130 connected to the control module 120 to convert waveforms of power into direct current or alternating current according to a control signal received from the control module 120. In addition, the plug-in ESS 10 may further include a casing 140 configured to accommodate each battery module 110, the conversion module 130, and the control module 120.

The plug-in ESS 10 may be connected to a grid G. The Grid G is a commercial power network. Power plants, various load devices, different energy storage systems, renewable energy production devices, and the like may be connected to the grid G. The renewable energy production devices may include various power generation methods used by wind power generators, solar cells, tidal power generators, etc. The plug-in ESS 10 may be connected to the grid G to charge power from the grid G or discharge the power to the grid G. The grid G may be connected to the plug-in ESS 10 through a circuit breaker CB and a transformer TR.

The circuit breaker CB may prevent fault current generated in the grid G from being transmitted to the plug-in ESS 10, and may prevent the fault current generated in the plug-in ESS 10 from being transmitted to the grid G. The transformer TR may mutually convert voltage of the grid G and voltage of the plug-in ESS 10 to each other.

In the plug-in ESS 10, the plurality of battery racks 100 is connected to the panel 200 by a predetermined number to form one cluster 300, and the energy storage system may be controlled in units of cluster 300. The cluster 300 is a unit in which the plurality of battery racks 100 is connected to one panel 200. The plug-in ESS 10 may be composed of a plurality of clusters 300. The plurality of battery racks 100 included in one cluster 300 may be charged or discharged by one panel 200. As an example, FIGS. 1 and 2 illustrate one cluster 300 including six battery racks 100.

The plug-in ESS 10 may include the panel 200 and the battery racks 100. The panel 200 may include: an energy management system 220 configured to generate control signals for controlling charging or discharging of the plurality of battery racks 100 and respectively provide the control signals to the plurality of battery racks 100; and an AC bus 210 connected to the plurality of battery racks 100 and configured to share power of the plurality of battery racks 100.

The energy management system 220 may control charging or discharging of the battery racks 100 connected to the panel 200. From the battery racks 100, the energy management system 220 may obtain information about the battery racks 100, the information including a current state of charge (SOC), a deterioration state of health (SOH), voltage, current, types of battery cells included in each battery rack 100, whether a corresponding battery is a reusable battery, and the like. The energy management system 220 may control discharge of the battery racks 100 according to the power required by the grid (G) or the load.

The AC bus 210 may be connected to the plurality of battery racks 100. A circuit breaker CB may be connected between the AC bus 210 and each battery rack 100. The AC bus 210 transmits power that the plurality of battery racks 100 is charging or discharging. The power in alternating current waveforms flows in the AC bus 210.

Each battery rack 100 may include each battery module 110, a control module 120, and a conversion module 130.

Each battery module 110 may include a plurality of battery cells. The battery cells may be connected to each other in series or in parallel. Each battery cell is a secondary cell capable of charging or discharging power. Each battery cell may be the secondary cell of various types, made of lithium-ion, lithium-polymer, iron phosphate, etc.

The control module 120 may control charging or discharging of each battery rack 100. The control module 120 may include one or more of the following: an AC connector 123AC configured to transmit and receive power to and from the panel 200, a DC connector 123DC configured to transmit and receive the power to and from each battery module 110, a communication connector 124 configured to transmit and receive data to and from the panel 200 or each battery module 110, an AC protection part 122AC connected to the conversion module 130 and the AC connector 123AC so as to prevent propagation of an accident, a DC protection part 122DC connected to the conversion module 130 and each battery module 110 so as to prevent the propagation of the accident, and a rack control unit 121 connected to the communication connector 124 to collect a state of each battery module 110 and control the conversion module 130 on the basis of a control signal received from the panel 200.

The AC connector 123AC is connected to an AC line 230 and the AC line 230 is connected to the AC bus 210 of the panel 200 to transmit and receive power in alternating current waveforms. The DC connector 123DC is connected to a DC line 150, and the DC line 150 is connected to each battery module 110 to transmit and receive power in direct current waveforms. The communication connector 124 is connected to a communication line 240, and the communication line 240 is connected to the energy management system 220 of the panel 200 to transmit and receive control signals or data. An AC protection part 122AC may be connected between the AC connector 123AC and a low-pass filter 132 of the conversion module 130. The AC protection part 122AC may block fault current transmitted from the conversion module 130 or the AC connector 123AC, so as to prevent propagation of an accident. The AC protection part 122AC may include an AC relay for performing a switching function to connect or disconnect power. The AC protection part 122AC may include an AC fuse for blocking an overcurrent. The DC protection part 122DC may be connected between the DC connector 123DC and a DC link capacitor 133 of the conversion module 130. The DC protection part 122DC may block the fault current transmitted from the conversion module 130 or the DC connector 123DC to prevent the propagation of the accident. The DC protection part 122DC may include a DC relay for performing the switching function to connect or disconnect the power. The DC protection part 122DC may include a DC fuse for blocking the overcurrent. Fault current includes overcurrent generated due to short circuit, damage, or the like.

The rack control unit 121 may be connected to the communication connector 124 to receive the state of each battery module 110, and may receive a control signal from the energy management system 220. The rack control unit 121 may control the conversion module 130 on the basis of a control signal received from the energy management system 220. The rack control unit 121 may include: a battery management system 121*a* configured to monitor a state of each battery module 110 and controlling charging or discharging thereof; and a power controller 121*b* configured to controlling a power converter 131 as the battery management system 121*a* controls the charging or discharging.

The battery management system (BMS) 121*a* may recognize the state of each battery module 110. The battery management system 121*a* may calculate a charge state, a deterioration state, internal resistance, and the like of each battery module 110 on the basis of data such as voltage, current, temperature, and the like of each battery module 110, the data being received from the communication connector 124. The battery module 110 may further include a module BMS, and the module BMS may provide information about the state of each battery rack 100 to the battery management system 121*a* of the control module 120. The battery management system 121*a* may control charging or discharging of each battery module 110 through the power controller 121*b*. The power controller 121*b* may control the power converter 131 of the conversion module 130 to charge or discharge each battery module 110 on the basis of the control signal generated by the battery management system 121*a*.

The conversion module 130 may convert waveforms of power into alternating current and direct current. The conversion module 130 may include one or more of the following: the low-pass filter 132 connected to the AC protection part 122AC to remove harmonics of AC power, the DC link capacitor 133 connected to the DC protection part 122DC to equalize the voltage of DC power, and the power converter 131 connected to the low-pass filter 132 and the DC link capacitor 133 and configured to change the waveforms of power into alternating current or direct current according to the control signal received from the rack control unit 121.

The low-pass filter 132 may be connected between the power converter 131 and the AC protection part 122AC so as to remove harmonics from the AC waveforms output from the power converter 131. The DC link capacitor 133 may be connected between the power converter 131 and the DC protection part 122DC so as to equalize the voltage of the DC power output from the power converter 131. The power converter 131 may convert the waveforms of power from alternating current to direct current or from direct current to alternating current according to a control signal received from the power controller 121b of the rack control unit 121. The power converter 131 converts alternating current into direct current during charging, and converts direct current into alternating current during discharging.

A conventional energy storage system has a six-layer structure proceeding in order from a grid G, to a transformer IR, to a panel, to a power conversion system (PCS), to a battery control panel (BCP), and to battery racks. Such a structure has many layers constituting one energy storage system, so the structure is disadvantageous in price and space optimization. In addition, alternating current and direct current are converted in one PCS, and the plurality of battery racks is connected in parallel to the DC bus of the battery control panel, so as to simultaneously charge and discharge the plurality of battery racks. In this structure, each battery rack shares the DC bus. In such a structure, the plurality of battery racks connected to the same DC bus should be operated under the same voltage and SOC states. Due to the difference in contact resistance of the battery racks or the difference in the resistance of the battery cells, such a structure is highly likely to cause impedance imbalance, and may cause unbalanced charge and discharge between the battery racks. Such a structure may not solve the imbalance of the battery racks, so system maintenance is difficult and the reliability is low. In such a structure, since different types of battery racks or reusable battery racks are unable to be mixed, and states of the battery racks in use and a state of new battery rack are different, it is difficult to connect to the same DC bus, and thus it is difficult to expand the battery racks.

In contrast, the plug-in ESS 10 according to the exemplary embodiment of the present disclosure may independently perform charging and discharging for each battery rack 100. The plug-in ESS 10 is provided with the conversion module 130 that converts direct current and alternating current for each battery rack 100. The plurality of battery racks 100 is connected in parallel to the AC bus 210 of the panel 200 to transmit AC power. Each of the plurality of battery racks 100 connected in parallel to the AC bus 210 may perform charging or discharging, individually. Therefore, among the plurality of battery racks 100, the energy management system 220 may control any one of the battery racks 100 to charge while discharging other battery racks 100. That is, each battery rack 100 may be individually controlled. In addition, the plug-in ESS 10 has a four-layer structure proceeding in order from the grid G, to the transformer IR, to the panel 200, and to the battery racks 100, so the structure is advantageous in optimizing the price and space of the system. In addition, since a part through which DC power flows in the plug-in ESS 10 exists only inside each battery rack 100, and in the plug-in ESS 10, since wires for connecting the panel 200 and the battery racks 100 to each other and a wire connecting the panel 200 and the transformer TR to each other exist only where AC power flows, wiring may be simplified.

In addition, in the plurality of battery racks 100, at least one battery rack 100 may include battery cells of a type different from that of other battery racks 100, or at least one battery rack 100 may include reusable battery cells. In this case, according to the type or charge state of each of the plurality of battery racks 100, the energy management system 220 may control to charge at least one battery rack 100 while simultaneously discharging other at least one battery rack 100, or may control the amount of power charged to or discharged from the at least one battery rack and the other at least one battery rack to be different from each other.

When the types of battery racks 100 are different, the capacity, rated voltage, rated current, charge states, deterioration states, internal resistance, and the like of battery racks 100 may be different. Even with the same type of battery racks 100, reusable battery racks 100 may have different capacity, rated voltage, rated current, charge states, deterioration states, internal resistance, and the like.

In the conventional energy storage system, when different types of battery racks are connected in parallel to one DC bus, there is a problem that an imbalance occurs in charging and discharging, so other types of battery racks may not be used.

In contrast, since the plug-in ESS 10 according to the exemplary embodiment of the present disclosure is provided with the conversion module 130 in each battery rack 100, and the battery racks are connected in parallel to one AC bus 210 so that each battery rack 100 may be individually controlled, different types of battery racks 100 or reusable battery racks 100 may be used.

For example, at least some of the plurality of battery racks 100 are battery racks 100 including battery cells of a first type, some others thereof may be battery racks 100 including battery cells of a second type, yet some others thereof may be battery racks 100 including reusable battery cells of the first type. Since the battery racks 100 of the first type, the battery racks 100 of the second type, and the reusable battery racks 100 of the first type have different characteristics of battery cells, the amount of charge and the amount of discharge may be different. Therefore, according to the characteristics and state of each battery, the plug-in ESS 10 may control at least one or more battery racks 100 of the plurality of battery racks 100 to perform charging, and may simultaneously control the rest of the battery racks 100 to perform discharging.

The energy management system 220 individually controls charging or discharging for each battery rack 100 in the plurality of battery racks 100 on the basis of the states of the battery racks 100, and may control the amount of power to be charged or discharged to be different for each battery rack 100. For example, the energy management system 220 may control any one of the battery racks 100 to perform charging by a first amount of power, may control another battery rack 100 to perform discharging by a second amount of power, and yet another battery rack 100 to perform charging by a third amount of power.

The energy management system 220 determines the states of the battery racks 100, and generates a control signal to be transmitted to each battery rack 100 in accordance with a power demand instruction received from the outside. The energy management system 220 calculates, in units of battery racks, the amount of power that may be charged or discharged on the basis of a charge state, a deterioration state, and the number of charge/discharge cycles, and may transmit, to each battery rack 100, a control signal for obtaining power by which the power converter 131 of each battery rack 100 may operate at maximum efficiency. In this process, which battery racks 100 will be operated is determined, or how many battery racks 100 will be operate is also determined by using the amount of power required from the outside, the battery state of each battery rack 100, and the maximum power efficiency point of the power converter 131.

Figure 3:
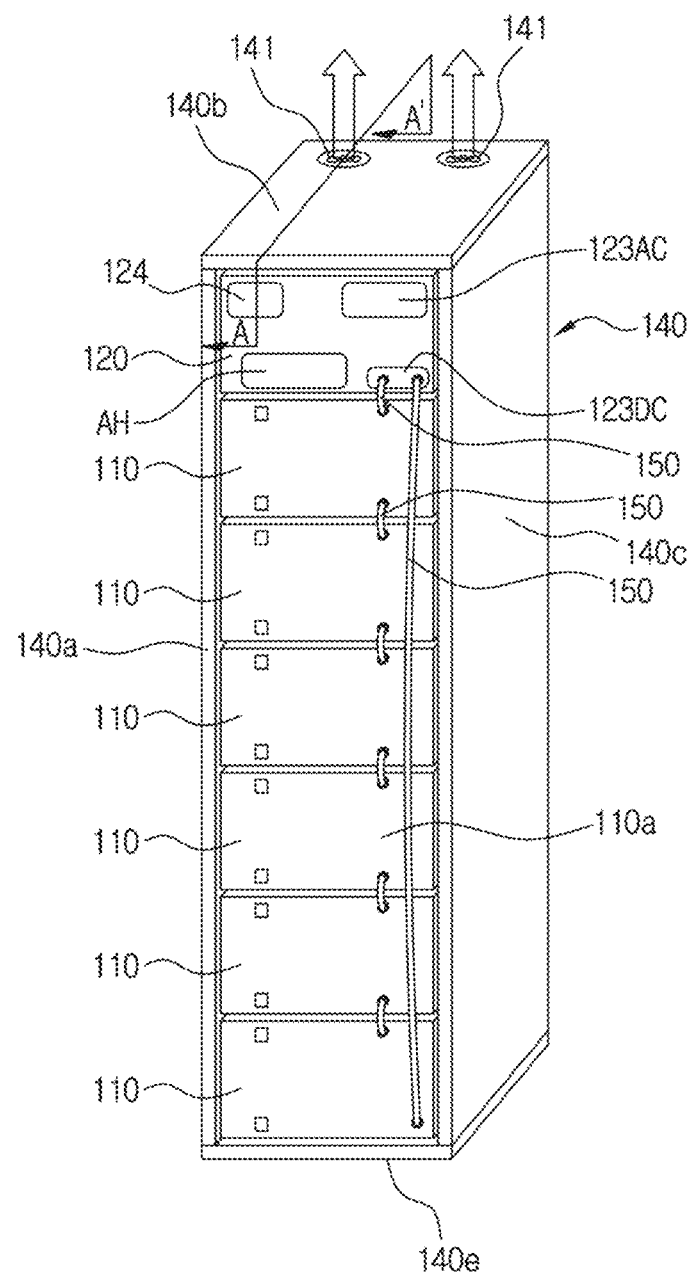
FIG. 3 is a view illustrating a structure of the battery rack of the plug-in type energy storage system according to the exemplary embodiment of the present disclosure.
Figure 4:
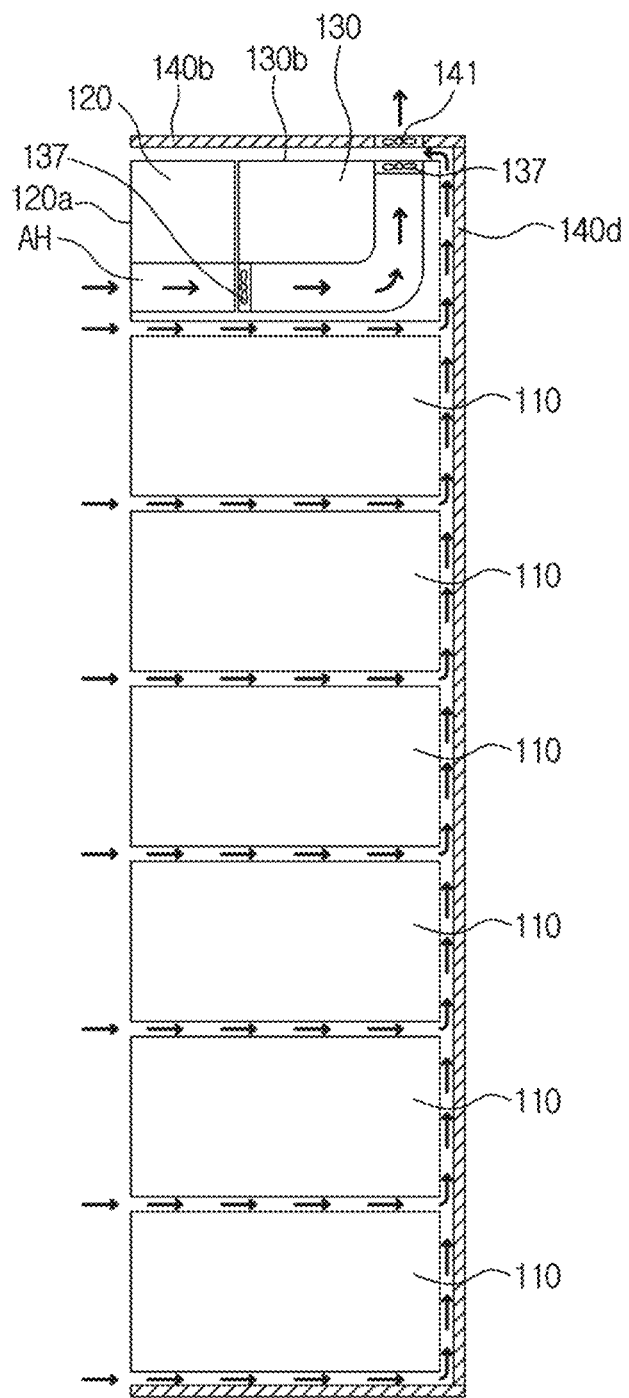
FIG. 4 is a side view taken along line A-A' of FIG. 3.
Figure 5:
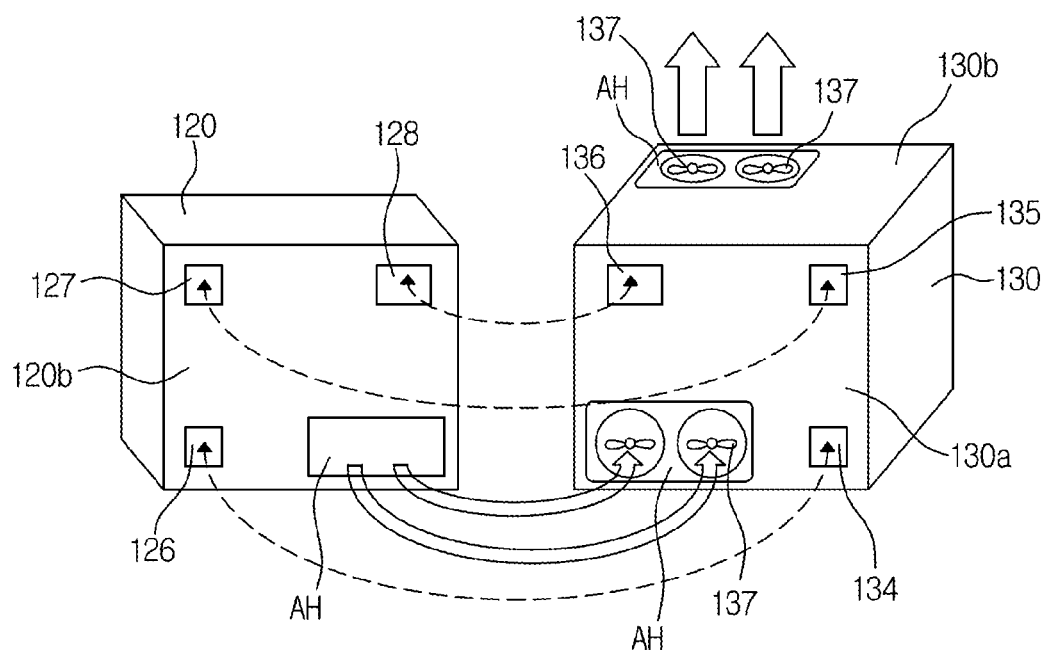
FIG. 5 is a view illustrating a combination of a control module and a conversion module of the plug-in type energy storage system according to the exemplary embodiment of the present disclosure.

FIG. 3 is a view illustrating a structure of a battery rack 100 of the plug-in type energy storage system 10 according to the exemplary embodiment of the present disclosure. FIG. 4 is a side view taken along line A-A' of FIG. 3. FIG. 5 is a view illustrating a combination of a control module 120 and a conversion module 130 of the plug-in type energy storage system 10 according to the exemplary embodiment of the present disclosure.

As shown in FIGS. 3 and 4, in each battery rack 100 of the plug-in ESS 10, each battery module 110, the conversion module 130, and the control module 120 are accommodated in the casing 140 to become one package, thereby allowing module exchange in units of battery racks.

One battery rack 100 may include the plurality of battery modules 110, the control module 120, and the conversion module 130. Each of the plurality of battery modules 110 may be individually packaged and accommodated in the casing 140. Each battery module 110, the control module 120, and the conversion module 130 may be individually packaged and accommodated in the casing 140. The control module 120 and the conversion module 130 may be configured in an integral form or in a form in which the same are individually manufactured and then combined to each other.

Conventionally, in the energy storage system, since the battery racks 100 are connected in parallel to the DC bus, when exchanging some of the battery racks 100, a difference occurs in the characteristics of the battery racks 100, and thus it is difficult to exchange the battery racks 100. In addition, the conventional energy storage system has a structure in which it is difficult to exchange only the battery racks 100 because the battery racks 100, the DC bus, and other components are integrally configured. In addition, initial installation of the conventional energy storage system is cumbersome because each component should be individually transported and assembled in a local site.

In contrast, the plug-in ESS 10 according to the exemplary embodiment of the present disclosure has a convenient structure for exchanging the battery racks 100 in units of battery racks 100 because each of the battery racks 100 is independently packaged. In addition, since the battery racks 100 are connected to the AC bus 210 and each battery rack 100 includes the conversion module 130, the battery racks 100 may be exchanged without stopping the entire plug-in ESS 10. In addition, since each battery rack 100 is independently packaged, it is convenient to transport the same, and it is also convenient because the operation may be performed in units of battery racks 100 even at the time of initial installation or exchange of the batteries.

The plug-in ESS 10 may arrange the battery racks 100 by distribution. Since it is not necessary to densely arrange the battery racks 100 in one space, the plug-in ESS 10 may be installed in a space-efficient manner. Since the battery racks 100 connected to one panel 200 are controlled by the energy management system 220 of the panel 200, an installation position of the battery racks 100 is sufficient as long as the position may secure the connections with the panel 200.

As shown in FIGS. 3 to 5, the plurality of battery modules 110 is arranged inside the casing 140 so as to be spaced apart from each other in the vertical direction or the left and right direction, the control module 120 and the conversion module 130 are arranged inside the casing 140 so as to be spaced apart from each other in the vertical direction or the left and right direction of the battery module 110, and the casing 140 may further include a fan 141 formed on one side of the casing 140 and configured to discharge, to the outside of the casing 140, air introduced from a gap spaced apart between the battery modules 110, the control module 120, and the conversion module 130.

The casing 140 accommodates the battery modules 110, the control module 120, and the conversion module 130 so as to package the same in units of battery racks 100. The control module 120 and the conversion module 130 are arranged on an upper part of the casing 140, and the plurality of battery modules 110 may be arranged on the remaining part of the casing 140. The casing 140 may be formed as a box in which a front surface 140a thereof is open, and opposite side surfaces 140c, a rear surface 140d, an upper surface 140b, and a lower surface 140e thereof are closed. In order to exchange the battery modules 110, the control module 120, or the conversion module 130, the casing 140 may be configured such that the battery modules 110, the control module 120, or the conversion module 130 are respectively attachable and detachable. When the battery modules 110, the control module 120, and the conversion module 130 are configured to be attachable to and detachable from the front surface 140a of the casing 140 in a sliding manner, it is easy to exchange each component. As shown in FIGS. 3 and 4, the casing 140 may arrange the battery modules 110, the control module 120, and the conversion module 130 in the vertical direction, or although not shown, may arrange the battery modules 110, the control module 120, and the conversion module 130 in the left and right direction. The shape of the casing 140 and the arrangement positions of the battery modules 110, the control module 120, and the conversion module 130 may be changed in various ways, and various methods may be used for the attachment and detachment method.

The casing 140 may accommodate the plurality of battery modules 110 to be spaced apart from each other by a predetermined distance. Air may flow through a gap spaced apart between the plurality of battery modules 110. The rear surface 140d of the casing 140 and each battery module 110 may be accommodated to be spaced apart from each other by a predetermined distance. The casing 140 may include a fan 141 on one side thereof. The fan 141 is positioned at the rear of the upper surface 140b of the casing 140 to operate so that air is discharged to the upper surface 140b of the casing 140, the air moving in a direction from the front surface 140a to the rear surface 140d of the casing 140. The flows of air is indicated by arrows in FIGS. 3 and 4. The control module 120 and the conversion module 130 are accommodated in an upper part of the casing 140 and may be arranged to be spaced apart from the battery module 110 by a predetermined distance.

The control module 120 and the conversion module 130 may be respectively provided with air holes AH formed thereon so that the air introduced from the front surface 120a of the control module 120 passes through the control module 120 and the conversion module 130, thereby being discharged to the upper surface 130b of the conversion module 13. The air hole AH formed in the upper surface 130b of the conversion module 130 may be formed at a position corresponding to the fan 141 of the casing 140. The air holes AH may be respectively formed in the front surface 120a and rear surface 120b of the control module 120, the air hole AH of the front surface 130a of the conversion module 130 may be formed at a position corresponding to the air hole AH formed in the rear surface 120b of the control module 120, and the air hole AH of the upper surface 130b of the conversion module 130 may be formed to correspond to the position of the fan 141 of the casing 140. The air introduced into the air hole AH of the front surface 120a of the control module 120 may cool the inside of the control module 120, move to the air hole AH of the front surface 130a of the conversion module 130, cool the inside of the conversion module 130, and then be discharged to the air hole AH of the upper surface 130b of the conversion module 130.

A fan 137 may be arranged in the air hole AH formed in the front surface 130a of the conversion module 130. The fan 137 arranged on the front surface 130a of the conversion module 130 suctions air from the air hole AH formed in the rear surface 120b of the control module 120 and discharges the air to the inside of the conversion module 130. The fan 137 may be arranged in the air hole AH formed in the upper surface 130b of the conversion module 130. The fan 137 arranged on the upper surface 130b of the conversion module 130 may suction air inside the conversion module 130 and discharge the air to the outside of the conversion module 130.

Since the control module 120 includes the AC connector 123AC, the DC connector 123DC, the communication connector 124, and the rack control unit 121, heat is relatively low compared with the conversion module 130. Since the conversion module 130 includes the power converter 131 that converts direct current and alternating current to and from each other, the heat is relatively high compared with the control module 120. Since air is introduced into the conversion module 130 passing a path through the control module 120, both the control module 120 and the conversion module 130 may be well cooled. Since there is provided a structure in which the air hole AH formed in the upper surface 130b of the conversion module 130 is positioned to correspond to the fan 141 of the casing 140, and the fan 141 of the casing 140 suctions and discharges the air that is discharged from the conversion module 130, it is easy to cool the conversion module 130.

The control module 120 has one surface thereof on which the AC connector 123AC, the DC connector 123DC, and the communication connector 124 are arranged, and each battery module 110 has one surface thereof to which the DC connector 123DC of the control module 120 or the DC line 150 connected to other battery modules 110 may be connected. FIG. 3 exemplarily illustrates the structure in which the AC connector 123AC, the DC connector 123DC, and the communication connector 124 are arranged on the front surface 120a of the control module 120, the front surface 120a of each battery module 110 is connected to the DC connector 123DC of the control module 120 or the DC line 150 connected to other battery modules 110, and the control module 120 and the battery modules 110 are arranged vertically. The control module 120 may include a first DC bus connector 126 and a first AC bus connector 127, which are connected to the conversion module 130 and positioned on the surface (e.g., the rear surface 120b) facing the conversion module 130. The conversion module 130 may include a second DC bus connector 134 and a second AC bus connector 135, which are connected to the control module 120, on the surface (e.g., the front surface 130a) facing the control module 120. The first and second DC bus connectors 126 and 134 are connected to each other to transmit DC power, and the first and second AC bus connectors 127 and 135 are connected to each other (refer to dotted line in FIG. 5) to transmit AC power. The control module 120 may include, on the rear surface 120b thereof, a first control signal connector 128 connected to the conversion module 130, and the conversion module 130 includes, on the front surface 130a thereof, a second control signal connector 128 connected to the control module 120. The first and second control signal connectors 128 and 136 are connected to each other (refer to the dotted line in FIG. 5) and transmits a control signal that allows the power controller 121b to control the power converter 131. By independently configuring the control module 120 and the conversion module 130 and forming the same to be connected to each other, when a problem occurs in any one of the control module 120 and the conversion module 130, only a corresponding module may be exchanged.

The DC line 150 is connected to the front surface 110a of each battery module 110. The DC line 150 connected to a front surface of each battery module 110 is connected to the front surface 110a of each adjacent battery module 110 or the DC connector 123DC of the control module 120. The battery modules 110 may be connected in series with each other. Since each battery module 110 is individually packaged, the battery modules 110 may be exchanged in units of battery module 110. Since the plurality of battery modules 110 is connected to each other in series, charging and discharging may be performed simultaneously even though there is a difference in characteristics between the battery modules 110 by exchanging any one battery module 110.

Depending on the arrangement relationship of the battery modules 110, the control module 120, and the conversion module 130, components such as various connectors, fans, and holes, which are formed on one surface of the battery modules 110, the control module 120, and conversion module 130 may be arranged on the front surface, side surfaces, rear surface, upper and lower surfaces, etc.

When any one of the plurality of battery racks 100 is exchanged or anew battery rack 100 is additionally connected, the energy management system 220 may receive information about the state of each battery rack 100 from the rack control unit 121 and automatically perform control according to the type or the charge state of each battery cell of each battery rack 100. When the battery racks 100 and the panel 200 are connected to each other through the AC line 230 and the communication line 240, the energy management system 220 automatically transmits and receives data to and from the rack control unit 121 of each battery rack 100. According to an algorithm for operating other battery racks 100 in the past, the energy management system 220 may operate the new battery rack 100 in conjunction with a conventional battery rack 100.

As described above, the present disclosure has been described in detail through specific exemplary embodiments, the exemplary embodiments are for describing the present disclosure in detail, and the present disclosure is not limited thereto. In addition, it is clear that the present disclosure may be modified or improved by those skilled in the art within the technical spirit of the present disclosure.

All simple modifications to changes of the present disclosure belong to the scope of the present disclosure, and the specific protection scope of the present disclosure will be made clear by the appended claims.

What is claimed is:

1. A plug-in type energy storage system, the system comprising:
one or more clusters connected to a grid through transformer,
wherein each cluster comprises:
a plurality of battery racks configured to store power; and
a panel configured to control charging or discharging of each battery rack, wherein the plurality of battery racks is connected to the panel by a predetermined number to form one cluster and the energy storage system is controlled in units of cluster,
wherein each battery rack comprises:
a plurality of battery modules configured to store the power, each battery module including a plurality of battery cells;
a control module connected to each battery module and the panel to control the charging or discharging of each battery module according to a control signal received from the panel; and
a conversion module connected to the control module to convert waveforms of the power into direct current or alternating current according to a control signal received from the control module,
wherein the panel comprises:
an energy management system configured to generate a control signal for controlling the charging or discharging of the plurality of battery racks and provide the control signal to each of the plurality of battery racks; and
an AC bus connected to the transformer, wherein the plurality of battery racks are connected to AC bus in parallel to transmit AC power, and
wherein the energy storage system is configured to, according to the type or a charge state of each of the plurality of battery racks, simultaneously control at least one battery rack to be charged and at least another battery rack to be discharged, or control an amount of power to be charged to or discharged from the at least one battery rack and the at least another battery rack to be different from each other.

2. The system of claim 1, wherein the battery rack further comprises:
a casing configured to accommodate each battery module, the conversion module, and the control module,
wherein each battery module, the control module, and the conversion module are individually packaged,
wherein, in order to exchange each battery module, the control module, or the conversion module, the casing is configured such that each battery module, the control module, or the conversion module are attachable and detachable, respectively, and
wherein each battery module, the conversion module, and the control module are accommodated in the casing to become one package, thereby allowing module exchange in units of battery racks.

3. The system of claim 1, wherein the control module comprises:
an AC connector configured to transmit and receive the power to and from the panel;
a DC connector configured to transmit and receive the power to and from each battery module;
a communication connector configured to transmit and receive data to and from the panel or each battery module;

an AC protection part connected to the conversion module and the AC connector to prevent propagation of an accident;
a DC protection part connected to the conversion module and each battery module to prevent the propagation of the accident; and
a rack control unit connected to the communication connector to collect a state of each battery module and control the conversion module on the basis of the control signal received from the panel.

4. The system of claim 3, wherein the conversion module comprises:
a low-pass filter connected to the AC protection part to remove harmonics of AC power;
a DC link capacitor connected to the DC protection part to equalize a voltage of DC power; and
a power converter connected to the low-pass filter and the DC link capacitor, and configured to change the waveforms of the power into the alternating current or the direct current according to a control signal received from the rack control unit.

5. The system of claim 4, wherein the rack control unit comprises:
a battery management system configured to monitor the state of each battery module and control the charging or discharging; and
a power controller configured to control the power converter as the battery management system controls the charging or discharging.

6. The system of claim 2, wherein the plurality of battery modules is arranged to be spaced apart from each other in a vertical direction or a left and right direction inside the casing,
the control module and the conversion module are arranged to be spaced apart from each other in the vertical direction or the left and right direction of each battery module inside the casing, and
the casing discharges air introduced from a gap spaced apart between each battery module, the control module, and the conversion module to outside of the casing, and further includes a fan formed on one side of the casing.

7. The system of claim 4, wherein the control module has one surface thereof on which the AC connector, the DC connector, and the communication connector are arranged, and
each battery module has one surface thereof to which the DC connector of the control module or the DC line connected to other battery modules are connected.

8. The system of claim 6, wherein the control module and the conversion module each have air holes formed therein so that the air introduced from a front surface of the control module passes through the control module and the conversion module, thereby being discharged to an upper surface of the conversion module, and
each air hole formed on the upper surface of the conversion module is formed at a position corresponding to the fan of the casing.

9. The system of claim 1, wherein, in the plurality of battery racks, at least one battery rack comprises battery cells of a type different from that of another battery rack, or at least one battery rack comprises reusable battery cells.

10. The system of claim 1, wherein, when any one of the plurality of battery racks is exchanged or a new battery rack is additionally connected, the energy management system receives information about a state of each battery rack from the rack control unit and automatically performs control according to a type or a charge state of each battery cell of each battery rack.

\* \* \* \* \*